Patented July 23, 1935

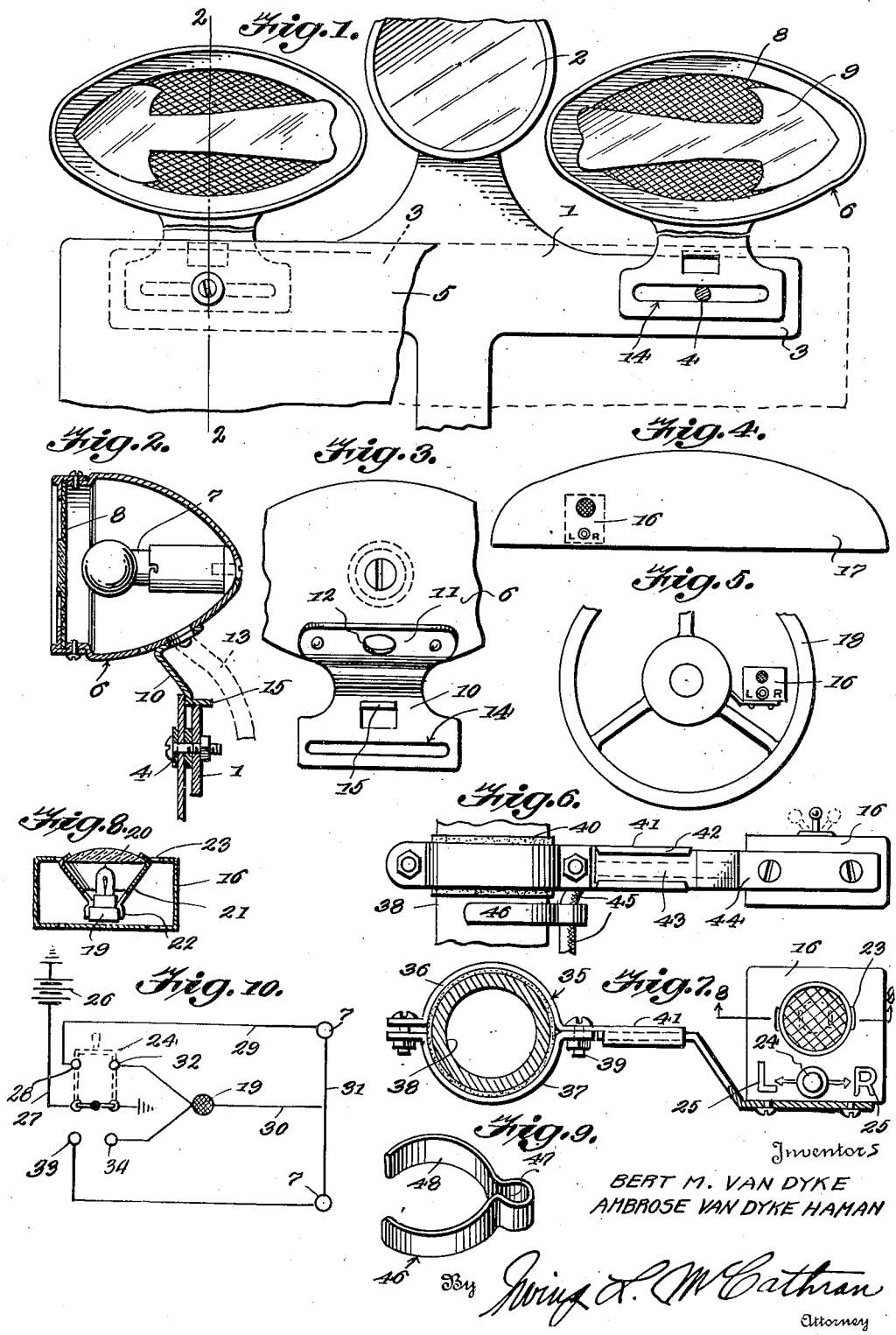
July 23, 1935. B. M. VAN DYKE ET AL 2,008,886
AUTOMOBILE SIGNAL
Filed March 23, 1933

2,008,886

UNITED STATES PATENT OFFICE 2,008,886

AUTOMOBILE SIGNAL

Bert M. Van Dyke and Ambrose Van Dyke Haman, Tunkhannock, Pa.

Application March 23, 1933, Serial No. 662,344

1 Claim. (Cl. 240—57)

This invention relates to automobile signals and has for its object the production of a simple and efficient automobile signal light which may be conveniently mounted adjacent the license tag or in any other suitable or convenient position in order to designate the direction of the turn the vehicle upon which the light is mounted, is about to make.

Another object of this invention is the production of a simple and efficient bracket support for the signal light.

A further object of this invention is the production of a simple and efficient control switch and means for mounting the control switch adjacent the steering wheel in a convenient location to be operated by the driver of the vehicle.

With these and other objects in view, this invention consists in certain novel constructions, combinations and arrangements of parts as will be hereinafter fully described and claimed.

In the drawing:

Figure 1 is a plan view of a portion of a supporting bracket and license tag showing the signal lights mounted thereon;

Figure 2 is a section taken on line 2—2 of Figure 1;

Figure 3 is a rear elevation of a portion of one of the lamps showing the supporting bracket attached thereto;

Figure 4 is a front elevation of a dashboard of an automobile showing a control switch mounted thereon;

Figure 5 is a top plan view of a steering wheel showing a control switch carried thereby;

Figure 6 is an enlarged side elevation of the control switch mounted upon a steering column;

Figure 7 is a top plan view of the structure shown in Figure 6, certain parts being shown in section;

Figure 8 is a section taken on line 8—8 of Figure 7;

Figure 9 is a detail perspective view of the cable retaining clamp or clip adapted to anchor the cable in conjunction with the steering column; and Figure 10 is a diagrammatic view of the electrical circuits employed for actuating the signals.

By referring to the drawing, it will be seen that 1 designates the supporting bracket for a license plate which may be of the conventional type common to the trade, the supporting bracket also carrying the tail light 2. This bracket 1 is preferably provided with a pair of laterally extending arms 3 having securing bolts 4 extending therethrough which are normally used for attaching a license plate 5 to the bracket. It is preferable to mount the signal lights 6 adjacent the tail light 2 and upon opposite sides thereof, and also in a position preferably above the license plate, although these lights 6 may if desired, be hung below the license plate without departing from the spirit of the invention.

A pair of these lights 6 are preferably employed comprising preferably oval shaped casings and a lighting bulb 7 is mounted within each casing or light 6. A suitable lens 8 which may be made of orange color celluloid is carried by each lamp 6 to permit utmost visibility and yet prevent reflection of sharp rays which would destroy the effectiveness of the arrow signal 9 formed upon the lens 8. The arrow signal 9 is preferably formed of a contrasting color sufficient to permit the arrow to be readily visible, so as to be easily distinguishable from the tail light. The face of each lamp is preferably roughened, as shown in Figure 1, to eliminate any glare or reflection at night from the headlights of any other car from behind, or in front in case lights are mounted on the front of the car. The arrows formed on the lens are preferably of a distinctive shape or design, as shown, and the arrows are preferably of a distinctive shade of frosted material.

Each lamp 6 is supported upon a specially constructed bracket 10, each bracket 10 having a flange 11 which is secured to the under face of a lamp 6, and extended at an angle to the body of the bracket 10, as shown in Figure 2, the flange 11 being connected to the lamp 6 by means of suitable rivets or other securing means. An aperture 12 is formed in the flange 11 through which the electrical cable 13 may pass for extending into the lamp casing. The bracket 10 is provided near its lower edge with an elongated transversely extending slot 14 through which a supporting bolt 4 may extend for the purpose of locking the bracket 10 upon the supporting bracket 1, the bracket 10 being capable of longitudinal adjustment upon the supporting bracket 1 due to the formation of the elongated slot 14 through which the bolt 4 passes. The bracket 10 is provided with a laterally bent tongue 15 which is preferably struck from the body of the bracket 10 and folded inwardly as clearly shown in Figure 2, and this tongue 15 is adapted to overhang the upper edge of the supporting bracket 1 and firmly hold the lamp 6 against tilting, thereby permitting the bracket 10 to be firmly locked in a set position upon the supporting bracket 1 merely by using a single bolt, such as illustrated in Figures 1 and 2. The various light units may be provided with suitable holes or apertures to provide for ventilation.

In conjunction with the lamps 6, it of course is necessary to employ some means for controlling the lighting of the bulbs 7 which are mounted within the lamps 6. This control means may be in the nature of a switch box 16 which may be either mounted upon the dashboard 17 of the vehicle or supported, as will be hereinafter described in connection with the steering wheel 18. The switch box 16 in each instance, is similarly constructed and may be varied as to shape and design to suit the desired location for mounting. The switch box 16 comprises a casing in which is supported a pilot light 19 over which fits a lens 20, which lens is supported preferably by a suitable cap 21 having spring clips 22 which are adapted to fit over the socket of the pilot light 19 and hold the cap 21 in position. Notches 23 may be formed in the switch box 16 for the purpose of facilitating the removal of the cap 21 when desired for replacing the pilot light 19. The switch box 16 also carries a double pole double throw toggle switch 24 having a center off position and a suitable legend indicating left and right indicia by the numeral 25 may be placed upon the outer face of the switch box 16. The indicia "L" and "R" are preferably radium illuminated for distinct visability at night. One side of the switch 24 is connected to a source of electrical supply 26 by means of a wire 27 and one pole 28 which is adapted to be engaged by the switch 24 is electrically connected to one of the bulbs 7 carried by one of the lamps 6 through the medium of the wire 29. The pilot light 19 is connected in series with each of the lamps 7 through the medium of a wire 30 and a wire 31 connects the bulbs 7 which are carried by the respective lamps 6. The pilot lamp 19, however, has two terminals, one of the terminals indicated by the numeral 32 being located adjacent the terminal 28 so as to close a circuit across the terminals 28 and 32, and cause the current to pass from the source of electrical supply 26 through the wire 27, through the terminal 28 by means of the double pole switch 24 through the wire 29 through the left lamp 7 through the wire 31 to the wire 30 through the pilot light 19 through the terminal 32 and through the switch to the ground.

By swinging the switch 24 to the right, the terminals of the switch 24 will contact with the terminals 33 and 34, thereby sending the current through the right bulb 7. In each instance, the pilot light 19 will burn, and should the pilot light 19 fail to function, the driver of the vehicle will be advised that the signal lights in the rear have failed to function. The burning of the pilot light also will call attention to the driver of the necessity for moving the switch to a neutral position after the desired turn has been made. From the above and by considering Figure 10, it will be seen that the pilot light 19 operates in the Right circuit when the switch 24 is thrown to the right, and in the Left circuit when the switch 24 is thrown to the left. This will allow the pilot light to constitute a trouble shooter to determine whether or not the various circuits are properly operating.

In many instances, it is desired to support the switch box 16 adjacent the steering wheel 18, and in order to support the switch box 16 in the desired position, a suitable clamping bracket 35 is employed comprising preferably a primary clamping section 36 and an auxiliary clamping section 37 which will both be adapted to fit around the steering column 38 and be held in clamping engagement by means of suitable securing bolts 39. A protecting packing 40 may be employed around the steering column 38, if desired. One of the sections of the clamp 35 is provided with a projecting arm 41 which arm is provided with a pair of side folded flanges 42 between which flanges extends and fits the projecting shank 43 of the switch box supporting arm 44. This arm 44 may be held in engagement with the arm 41 if desired, by means of suitable anchoring screws or in any other suitable or desired manner. The arm 44, however, may be adjusted within the length of the flanges 42 to place the switch box 16 at a desired and convenient location relative to the steering column 38. This arm 44 is preferably bent at an angle to support the switch box 16 in offset relation with respect to the longitudinal axis of the clamp 35. The conducting cable 45 which passes from the switch box 16 is held in close proximity to the steering column 38 by means of a spring clip 46 which is provided with a reduced or restricted eye 47 through which the cable 45 passes and turned-in spring jaws 48 which straddle the steering column 38, as shown, thereby permitting the clip 46 to be detachably secured to the column 38 for the purpose of adjusting or removing, when desired.

It should be understood that certain detail changes in the mechanical construction may be employed, so long as such changes fall within the scope of the appended claim.

Having described the invention, what is claimed as new is:—

As a new article of manufacture, a bracket for supporting a signal lamp comprising a sheet metal body having an angularly bent flange at its upper end upon which a lamp is adapted to rest and be secured in position, the body having an elongated slot through which a securing bolt is adapted to pass, said body having at a point intermediate the slot and the flange a laterally bent tongue struck from the body of the bracket and extending at substantially right angles to the body of the bracket, the flange of the bracket being arranged to support a lamp substantially above the tongue, the tongue being adapted to overhang a support and constitute a means for sustaining the weight of the lamp and relieve strain from the securing bolt which is adapted to pass through the slot in the bracket, said tongue also bracing the bracket against twisting movement upon a support and holding the bracket against tilting whereby the bracket may be held in position by the use of a single bolt.

BERT M. VAN DYKE.
AMBROSE VAN DYKE HAMAN.